April 21, 1959 A. E. GRAY ET AL 2,883,188

DATA PROCESSING APPARATUS

Filed May 13, 1957 4 Sheets-Sheet 1

INVENTORS:
Alfred E. Gray
Herman J. Malin
Harold B. Thompson
By Smyth & Roston
Attorneys April 21, 1959 A. E. GRAY ET AL 2,883,188

DATA PROCESSING APPARATUS

Filed May 13, 1957 4 Sheets-Sheet 2

INVENTORS
Alfred E. Gray
Herman J. Malin
Harold B. Thompson

By Smyth & Roston
Attorneys

INVENTORS:
Alfred E. Gray
Herman J. Malin
Harold B. Thompson
By Smyth & Roston
Attorneys

DATA PROCESSING APPARATUS

Filed May 13, 1957 4 Sheets-Sheet 4

INVENTORS:
Alfred E. Gray
Herman J. Malin
Harold B. Thompson
By Smyth & Roston
Attorneys.

United States Patent Office 2,883,188
Patented Apr. 21, 1959

2,883,188

DATA PROCESSING APPARATUS

Alfred E. Gray, Culver City, Herman J. Malin, Los Angeles, and Harold B. Thompson, Playa Del Rey, Calif., assignors to Magnavox Company, Los Angeles, Calif., a corporation of Delaware Application May 13, 1957, Serial No. 658,590

17 Claims. (Cl. 271—4)

The present invention relates to data processing apparatus in which information storage cards are processed to enable data already recorded on such cards to be utilized and also to enable new data to be recorded on the cards.

The invention is more particularly concerned with data processing apparatus which includes an improved holding station for holding the information cards in a generally stacked condition adjacent a transporting medium. The holding station of the apparatus is so constructed that a large number of information cards from the transporting medium may be deposited in it at a high rate of speed without jamming the cards. Such jamming is most undesirable because it not only requires that the apparatus be stopped and the data processing sequence be interrupted until the jammed condition of the cards can be corrected, but it also presents a likelihood of permanent damage to the cards involved and a resulting distortion of the data recorded on such cards. It may also cause the cards to become mixed from a proper order.

In some known types of data processing systems, the data is recorded on the individual cards in the form of holes. These holes are generally patterned in accordance with a selected binary code to represent the particular data recorded on each card. In other types of data processing systems the information is recorded on the cards in the form of magnetic areas of north or south polarity. Each north pole area represents, for example, a "true" or unity "1" condition and each south pole area represents a "false" or zero "0" condition.

The present invention will be described in conjunction with the magnetic type of system described in the previous paragraph. It will become obvious, however, as the description proceeds, that the apparatus of the invention is appropriate for use in any system in which information is recorded on a plurality of discrete cards. The actual recording techniques or methods are immaterial insofar as the present invention is concerned.

It is usual in data processing systems to transport the information storage cards successively from a feeding station in which they are stored to a sensing position at which the individual cards are processed. After such processing, the cards are transported to a stacking station in which they are once more stored. For flexibility in the system and for rapid operation, it is desired that both these stations be reversible. This enables one of the stations to function as a feeding station and the other as a stacking station for one particular pass of the cards, for the functions of the two stations to be reversed for a second pass of the cards, and so on. Reversible stations for this purpose are described and claimed in copending application Ser. No. 645,639, filed March 2, 1957, by Alfred M. Nelson and Allan Orner.

In a preferred type of data processing system, rotatably mounted vacuum pressure drums are used to perform the transporting functions for the cards. An improved construction for such a drum is disclosed and claimed, for example, in copending application Ser. No. 600,975, filed July 30, 1956, in the name of Loren R. Wilson. This particular type of transporting drum will be described in detail subsequently in the present specification.

The cards are held in the feeding and stacking stations in stacked relation with the face of the leading card engaging the periphery of the transporting drum. Appropriate reversible transfer mechanisms are included in the station, either to remove cards from the drum in one operational mode and deposit them in the station, or in a second operational mode to controllably feed cards from the station to the periphery of the drum.

Because of the large number of cards used in complex data processing systems, it is important from a time standpoint that the cards move in and out of the stations at an extremely high rate of speed and that a relatively large number of cards be handled by the varous stations.

It has been found in the past that there may occasionally be a tendency for the cards to jam as they are fed into a holding station from a transporting medium such as a rotatable vacuum pressure drum. This jamming has been found to become more prevalent when large numbers of cards are fed into the holding station and when the speed of feeding the cards is relatively high. The cause for this jamming of the cards has been found to result from the fact that cards fed into the station are normally urged against the transporting drum by cards already in the station. This causes subsequent cards to become arrested on the drum while they are still displaced from the mouth of the station. Such subsequent cards are therefore, prevented from being deposited in the station. These latter cards then arrest further subsequent cards on the drum to aggravate the jammed condition.

The combination of the present invention includes a movable element which engages the trailing edges of the cards as they are deposited into the holding station. This movable element continually moves the trailing edge of each card away from the periphery of the transporting drum as the cards are being deposited in the station. This maintains the stacked cards in the station at a proper approach angle to the drum and the possibility of jamming of the cards is thereby obviated.

The simple apparatus of the present invention has been found completely to eliminate jamming in the feed of the cards from a transporting drum to a holding station. The apparatus, therefore, permits a material increase in the processing speed of data processing systems, and it also permits a large increase in the number of cards that can be handled in any one pass by such systems.

In the drawings:

Figure 1 is a top plan view of a simplified data processing system utilizing the apparatus of the invention and illustrating in somewhat schematic form a pair of reversible feeding-stacking stations disposed contiguous to a rotatable transporting drum and adapated to feed information cards to and from the drum for processing;

Figure 2 is a perspective view of a reversible feeding-stacking station constructed to incorporate the teachings of the present invention and showing particularly apparatus including a rotatable wheel positioned adjacent the leading wall of the station, the wheel to engage the trailing edges of cards fed into the station and quickly move and hold such edges away from the periphery of the transporting drum;

Figure 1:
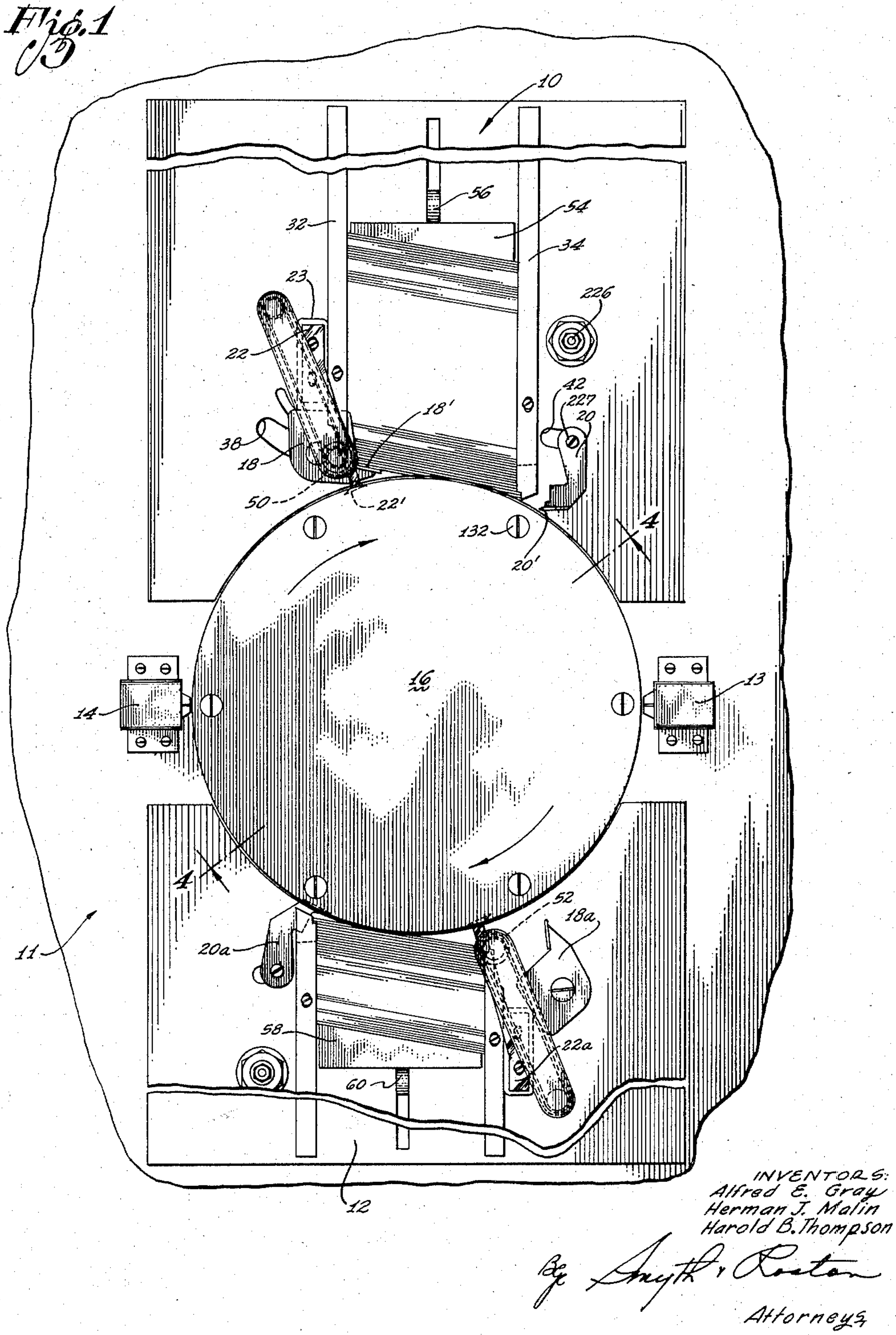
Figure 2:
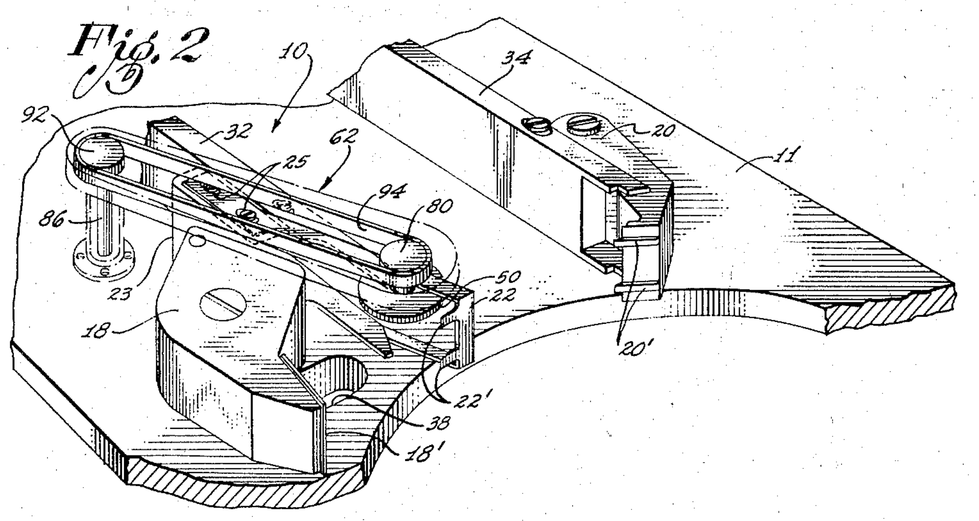
Figures 5, 6:
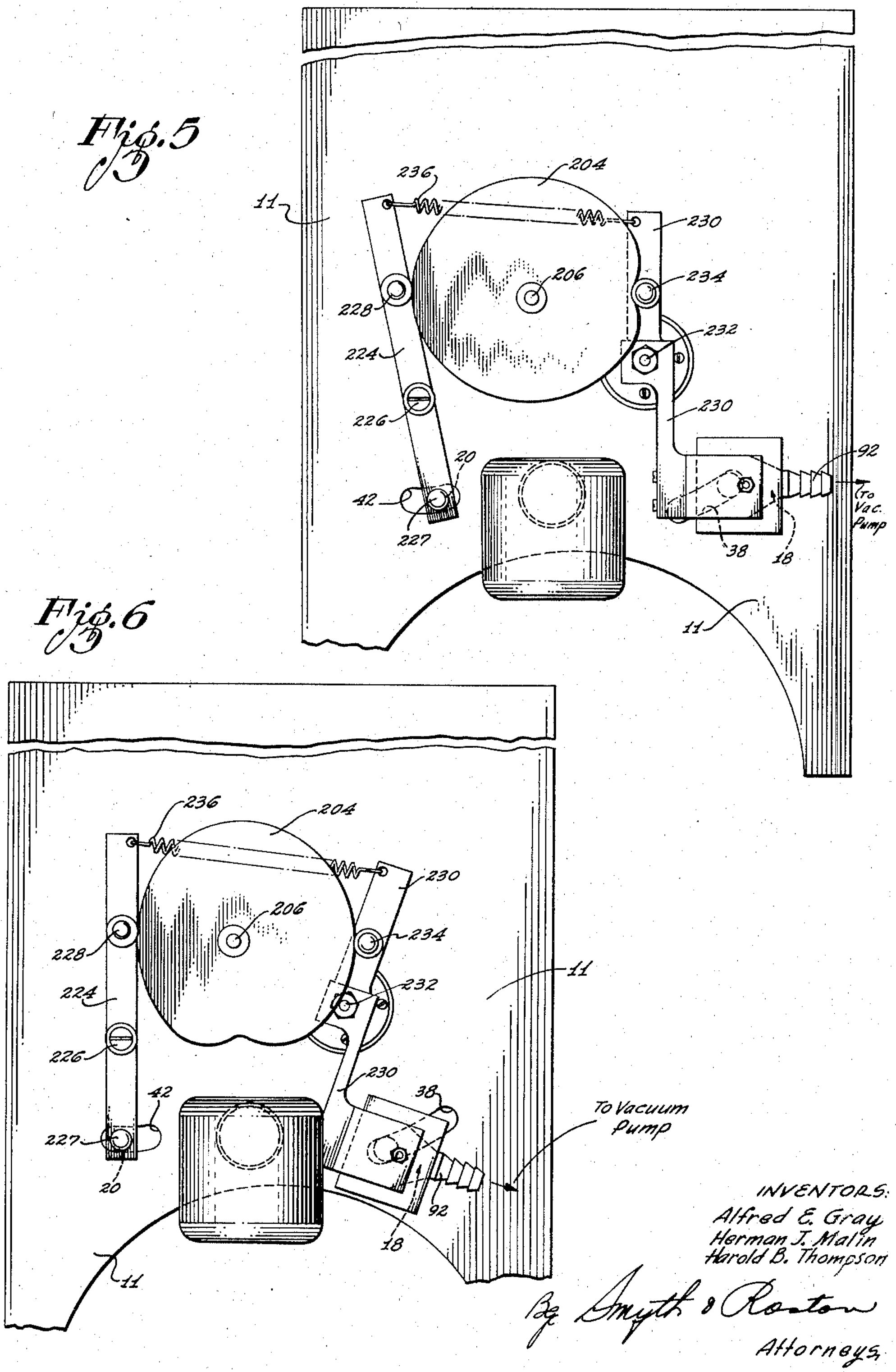

4—4 of Figure 1 and showing the constructional details of the rotatable drum of Figure 1 which enable the drum to produce a vacuum pressure at its peripheral surface so that information cards may be rigidly held and transported on that surface; and Figures 5 and 6 are bottom views of the reversible station of Figure 2 to show an appropriate control for actuating the station to its feeding or to its stacking mode, the station being in its stacking mode in Figure 5 and in its feeding mode in Figure 6.

In the system of Figure 1, a rotatable vacuum pressure drum 16 is mounted on a horizontal table top 11 for rotation about a vertical axis. The drum is constructed in a manner to be described so that it may exert a vacuum pressure at its peripheral edge. This, as noted above, enables the drum firmly to retain the information cards in fixed angular positions about its periphery so that these cards may be transported by the drum.

A first card holder 10 is mounted on the table top 11 with its mouth in contiguous relation with the peripheral edge of the drum 16. A second card holder 12 is also mounted on the table top 11, and the second card holder is positioned diametrically opposite to the card holder 10. The card holder 12 also has its mouth disposed in contiguous relation to the drum 16. The drum 16 is illustrated as rotating in clockwise direction.

A first transducer means 13 is mounted on the table top 11, and this transducer means is positioned between the card holders 10 and 12. A second transducer means 14 may also be mounted on the table top 11, and the second transducer means is positioned on the opposite side of the drum 16 from the transducer means 13. The transducer means 13 and 14 may be any suitable and well known type of electromagnetic transducer head, or series of heads. For example, they may be constructed in a manner similar to that described in copending application Ser. No. 550,296 filed December 1, 1956 by Alfred M. Nelson et al.

The card holder 10 has a vacuum pressure feed head 18 pivotally mounted adjacent its leading wall 32 with respect to the direction of rotation of the drum 16. The card holder 10 also has a stack head 20 which is pivotally mounted adjacent its trailing wall 34 with respect to the direction of rotation of the drum 16.

The construction and operation of the feed head 18 and of the stack head 20 may be similar to that described in copending application Ser. No. 645,639 referred to above. It is believed unnecessary to include a detailed description of the constructional details of these units in the present application. It should be pointed out, however, that the feed head 18 is controlled to exert a vacuum pressure at its surface 18' when the transfer apparatus associated with the card holder 10 is in its first or feeding operational mode and the feed head is in its operative position. This vacuum pressure is exerted on the trailing portion of the leading card in the card holder 10. The same leading card rests on the peripheral edge of the drum 16, and the drum also exerts a vacuum force on this card. The stack head 20 is withdrawn to its standby position when the station is in its feeding mode with the feed head 18 in its operative position.

The force exerted by the drum 16 tends to withdraw the leading card from the card holder 10 whereas the force exerted by the feed head 18 tends to retain that card in the holder. The force exerted by the head 18 is made the greater of the two so that it is able to overcome the force exerted on the card by the drum 16. So long as the leading card is held in this manner in the card holder 10, the other cards supported in stacked relationship in the card holder behind the leading card are also held in the holder. The cards are so held in the card holder in a generally stacked relationship and in individual vertical planes, with the lower edges of the cards resting on the surface of the table top 11.

Whenever the vacuum pressure to the feed head 18 is momentarily interrupted, the leading card in the card holder is withdrawn by the drum 16. The interval of the interruption in the vacuum pressure to the head 18 is conveniently made such that only one card can be released from the card holder to the periphery of the drum 16. The next card in the stack now comes into the lead position, and it is retained in the card holder in the manner described until the next interruption of the vacuum pressure to the feed head 18.

In the second or stacking operational mode of the station incorporating the card holder 10, the feed head 18 is withdrawn to its standby position and its vacuum pressure is turned off. The stack head 20 is simultaneously moved into substantial engagement with the drum. When the apparatus is in this latter operational mode, any card transported by the drum is stopped by the stack head 20.

A pick-off member 22 is mounted adjacent the leading wall 32 of the card holder 10. This pick-off member has a series of fingers 22' which extend into the peripheral grooves in the drum 16, and the stack head 20 has fingers 20' (Figure 2) which also extend into these grooves. The fingers 22' are humped radially outward so that the cards transported by the drum ride over the fingers and are lifted outwardly from the periphery of the drum. Therefore, each card arrested by the stack head 20 has its trailing edge projecting over the fingers 22'. The succeeding card transported by the drum 16 rides over the fingers 22' and under the preceding card so as to pry the preceding card from the periphery of the drum. The succeeding card is also stopped by the stack head 20 and the preceding card is deposited in the card holder 10. In this manner, the apparatus is conditioned to its second or stacking mode in which cards transported by the drum 16 are stacked in the card holder 10.

Therefore, the dual feeding-stacking station described above has two operational modes. In the first or feeding mode, cards are held in stacked relationship in the card holder 10, and such cards may be controllably and successively fed to the peripheral surface of the transport drum 16. In the second or stacking mode, cards transported by the periphery of the drum 16 are stripped from that periphery and are deposited in the card holder 10.

The card holder 12 also may have a feed head **18*a* associated with its leading wall, and it may also have a stack head 20*a* associated with its trailing wall. The card holder 12 also may have a pick-off member 22*a* mounted adjacent the feed head 18*a*. The feed head 18*a* and the stack head 20*a* may be similar in their construction and operation to the corresponding heads 18 and 20 associated with the card holder 10. Likewise, the pick-off member 22*a* may be similar to the pick-off member 12**.

In its feeding mode of operation, the card holder 10 may contain a plurality of information storage cards in stacked relationship. In that mode the transfer mechanism associated with the card holder 10 is conditioned for controllably feeding the cards to the drum 16. The card holder 12 at this time is in its stacking mode, and its transfer mechanism is conditioned to deposit cards in the card holder. The cards from the card holder 10 may now be controllably fed to the transport drum 16 and transported by that drum past the transducer means 13 for processing. After processing of the cards by the transducer means 13, they are deposited in the card holder 12. At the completion of this operation, the operational modes of the transfer mechanisms associated with the card holders 10 and 12 may be reversed so that the cards may be returned in their original order to the card holder 10. The cards may be further processed by the transducer means 14 on their return trip.

The system of Figure 1 is included to illustrate an operational application to which the apparatus of the present invention may be placed. The apparatus of the invention includes in the station 10, for example, a rotatable wheel 50. This rotatable wheel is suspended in a manner to be described over the feed head 18 adjacent the leading wall 32 of the station with respect to the direction of rotation of the drum 16. The wheel 50 is rotatable about a vertical axis. The peripheral edge of the wheel 50 protrudes into the station 10, and the wheel is adapted to frictionally engage the trailing edges of the cards fed into that station when the station is in its stacking mode.

In the illustrated operational mode, the station 10 is conditioned as a feeding station. For this mode, the feed head 18 is moved forward to its operative position, and as described above, the surface 18' of the feeding head engages the trailing portion of the face of the leading card in the station. The arrangement is such that the feeding head in its operative position holds the cards in the station 10 at a desired angle to the periphery of the drum 16. This angle is such that the cards may properly be fed in a one-by-one sequence out of the station and onto the periphery of the drum.

When the feed head 18 is in its illustrated position, it preferably holds the cards up and away from the rotatable wheel 50. This enables the wheel to be continuously rotated, but it is ineffective when the station is in its illustrated feeding mode. It should be appreciated that the wheel 50 can also be made under some circumstances to engage the trailing ends of the cards in the station 10 during a feeding operation. By producing such a frictional engagement between the cards and the wheel 50, the cards can be tilted forwardly in a manner similar to that provided by the feed head 18 so as to facilitate the transfer of cards from the stack 10 to the periphery of the drum 16.

A similar wheel 52 is positioned adjacent the leading wall of the station 12. The wheel 52 is also rotatably mounted about a vertical axis. The wheel 52 is suspended, in like manner to the suspension of the wheel 50, over the feed head **18*a***.

The rotatable wheel 52 and the wheel 50 are preferably knurled. The wheel 52 is positioned adjacent the mouth of the station 12, and a portion of the periphery of the wheel protrudes into the station. The wheel 52 is adapted to frictionally engage the trailing edge of the cards deposited in the station 12 by the stack head **20*a*. In its illustrated stacking mode, the station 12 is conditioned to receive cards from the periphery of the drum 16. To execute this, the stack head 20*a* is moved forward to its stacking position, and the feed head 18*a* is moved back to its standby position. As each card is deposited in the station 12, under the joint action of the stack-head 20*a* and the pick-off 22*a*, the trailing edge of such card is engaged by the periphery of the wheel 52. This causes the trailing portion of the card to be moved and held away from the periphery of the drum 16**.

The station 10 includes a pusher member 54 which is spring biased by a coil spring 56 toward the mouth of the station. This pusher member maintains the cards in a stacked condition within the station, and it serves to hold the stack of cards biased forwardly in the station and against the periphery of the drum 16. The station 12 includes a similar pusher member 58, and this latter pusher member is spring biased toward the mouth of the station 12 by a coil spring 60.

The pusher 58 holds the cards in stacked condition in the station 12. The inclusion of the rotatable wheel 52 serves to maintain at least the leading cards in the station at an angle to the periphery of the drum 16. Without the wheel 52, there is a tendency for the cards in the station 12 to be moved by the pusher 60 against the periphery of the drum 16, and this prevents succeeding cards from reaching the stack head **20*a* so that they may be appropriately deposited in the station 12. As described above, this results in a condition in which cards may become jammed at the mouth of the station 12**.

The inclusion of the rotatable wheel 52 serves to hold the trailing edges of the cards in the station 12 back from the periphery of the drum 16. This maintains the area clear for the succeeding cards transported by the drum to the station. That is, each card on the drum 16 reaching the mouth of the station 12 has a clear path to the stacking head **20*a* so that such card may be properly deposited in that station. The use of the rotatable wheel 52 permits a relatively large number of cards to be fed at the relatively high speeds to the station 12. When the station 10 is in its stacking mode, the rotatable wheel 50 serves the same function as the wheel 52 in the station 12 to enable a large number of cards to be rapidly fed into the station 10** and without the possibility of jamming.

Figure 3:
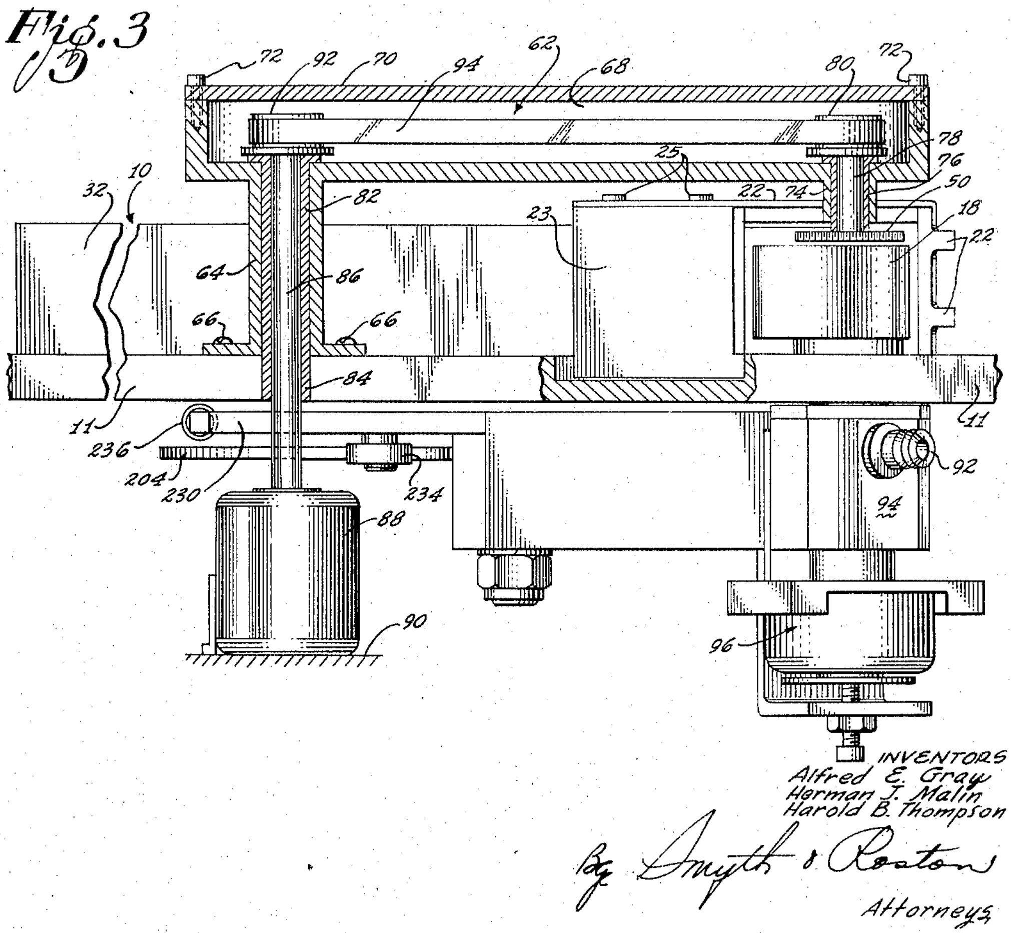
Figure 3 is a side view, partially in section, of the reversible station of Figure 2 and showing how the rotatable wheel is suspended over a feed head associated with the station in a manner so that the wheel may perform its intended function and yet not interfere with the operation of the feed head or other components making up the transfer mechanism of the station.

The perspective view of the station 10 shown in Figure 2 and the partially sectional side view of the station 10 in Figure 3 show a particular manner in which the rotatable wheel 50 may be mounted without interfering with the normal operation of the reversible mechanism associated with that station. It is to be understood, that the wheel 52 may be mounted in the same manner in the station 12.

As shown, for example, in Figure 2, the card holder 10 includes a guide rail 32 which constitutes its leading wall, and it includes a guide rail 34 which constitutes its trailing wall. These guide rails are mounted in spaced and parallel relation on the table top 11, and they extend outwardly away from the drum 16 (Figure 1). The guide rails serve to support the cards in individual perpendicular planes with their lower edges resting on the table top.

The leading end of the guide rail 34 is bifurcated to receive the stack head 20. This stack head is movable in a slot 42 in the table top between its operative and standby positions, in a manner to be described. The guide rail 32 also has a bifurcated end portion for receiving the feed head 18, and the feed head is movable in a slot 38 in the table top 11. The pick-off 22 is mounted on a block 23 adjacent the external surface of the guide rail 32 by means of a pair of screws 25.

A housing 62 (Figure 3) is supported on the table top 11 adjacent the guide rail 32 but outside of the station 10. The housing 62 has a tubular vertical portion 64 which is secured to the table top 11 by means, for example, of a pair of screws 66. The housing also includes a horizontal portion 68 which extends at an inclination across the top of the block 23 and the pick-off 22 and over the feed head 18.

The horizontal portion 68 of the housing 62 has a cover 70 which is secured to the housing by screws such as the screws 72. The forward end of the horizontal portion 68 is integral with a second tubular vertical portion 74. A cylindrical bearing 76 is supported in the tubular portion 74, and a shaft 78 is rotatably mounted in this bearing. The wheel 50 is keyed to the lower end of the shaft 78, and a pulley 80 is keyed to the upper end of the shaft, the pulley being disposed in the horizontal portion 68 of the housing 62.

As stated above, the pulley 50 is preferably knurled, and it may be composed of a material, such as rubber, so that it may frictionally engage the cards as they enter the station 10, as described above. The wheel 50 is held by the housing 62 so that it is disposed in a horizontal plane over the path of the feed head 18, and with a portion of the periphery of the wheel extending through the bifurcated end portion of the guide rail 32 and into the mouth of the station 10.

A cylindrical bearing 82 is disposed in the tubular vertical portion 64 of the housing 62, and a tubular bearing 84 is mounted in an aperture in the table top 11 in axial alignment with the bearing 82. A vertical drive shaft 86 extends downwardly through the bearings 82 and 84, and this shaft is driven by a motor 88. The motor 88 is mounted on any appropriate supporting surface 90 under the table top 11.

A pulley 92 is keyed to the upper end of the shaft 84, and this pulley is disposed in the horizontal portion 68 of the housing 62. A drive belt 94 couples the pulley 92 to the pulley 80. The motor 88, therefore, drives the wheel 50 through the drive shaft 86, through the belt 94, and through the drive shaft 78. The wheel 50, therefore, is rotated to perform its intended function. The mounting structure for the wheel is such that it does not interfere with the movement of the feed head 18 as the feed head is moved between its standby and operative positions.

As noted above, the feed head 18 provides a controllable vacuum pressure at its surface 18'. This vacuum pressure can be produced by means of a suitable vacuum line which is coupled to a nipple 92 in the feed head under the table top 11. The nipple 92 is connected to a valve assembly 94, which also is disposed under the table top 11, and which forms a portion of the mechanism controlling the feed head 18. A solenoid actuated valve 96 is associated with the valve assembly 94, so that the supply of vacuum pressure to the surface 18' of the feed head 18 may be controlled. The actual structural details of the feed head 18 and its associated valve assembly form no part of the present invention. A full description of these assemblies may be found in the copending application Ser. No. 645,639 filed March 12, 1957, in the names of Alfred M. Nelson and Allan Orner.

In a constructed embodiment of the invention, wheels of 1⅛" diameter were used as the wheels 50 and 52, and these wheels were driven at 47 r.p.m. Satisfactory results were obtained by the use of such wheels, and by driving the wheels at such a speed.

Figure 4:
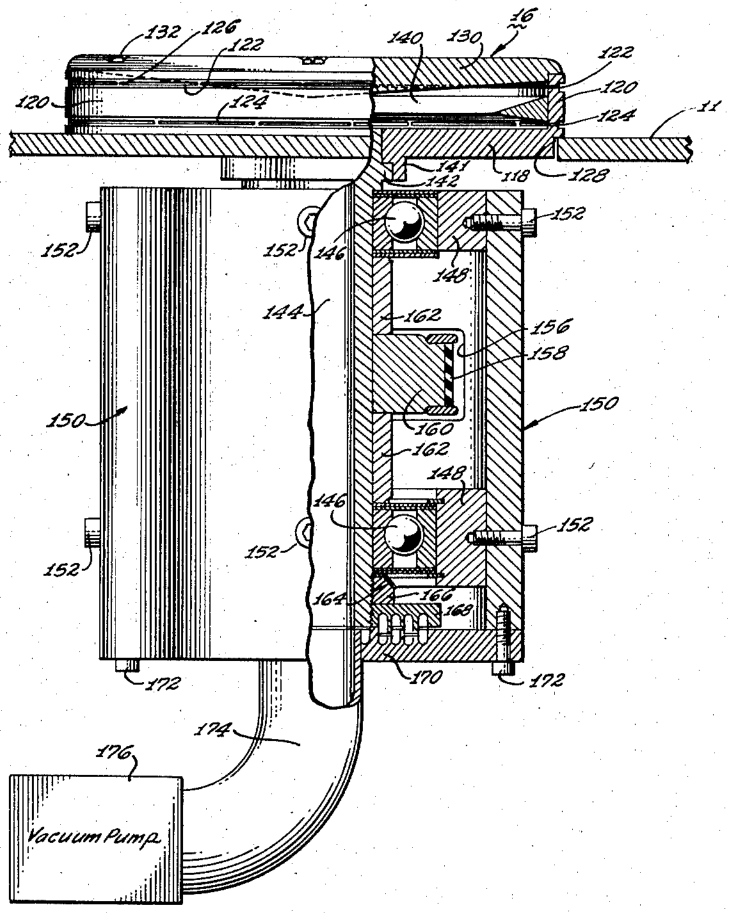
Figure 4 is a sectional view substantially on the line

Details of the vacuum transporting drum 16 are shown in Figure 4. As noted above, this drum is similar in its construction to the unit disclosed and claimed in copending application Ser. No. 600,975 filed July 30, 1956, in the name of Loren R. Wilson.

As shown in Figure 4, the vacuum transporting drum 16 is made up of a lower section and an upper section. The lower section includes a disc-like bottom surface 118 and an annular side portion 120 integral with one another. A pair of axially spaced peripheral orifices 122 and 124 extend through the side portion 120. Each of these orifices is discontinuous in that it is interrupted at selected intervals about its periphery by ribs 126 integral with the side portion 120. The orifices have respective external peripheral annular channels associated with each of them, and fingers such as the fingers 22' (Figure 2) of the pick-off 22 and the fingers 20' of the stack head 20 extend into these channels. This engagement of the fingers 20' and 22' with the annular channels permits the cards to be removed from the periphery of the drum and deposited in either of the stations in the described manner, when the particular stations are in their stacking mode.

The disc-like bottom portion 118 of the lower section of the drum is undercut, as shown at 128. This is so that at least the end of this portion will have a reduced diameter with respect to the outer diameter of the annular side portion 120. This enables the table top 11 to extend beyond the outer limits of the side portion 120. Therefore, even without excessively close tolerances between the edge of the table top 11 and the rotating surface of the drum 16, the cards supporting endwise on the table top in the card holder 42 have no tendency to slip down between the table and the drum and become misplaced and damaged.

The upper section of the drum 16 is in the form of a disc-like member 130 which engages the annular side portion 120 of the lower section. The upper section 130 forms an enclosure with the lower section of the drum, with the upper section parallel to the disc-shaped bottom portion 118 of the lower section. The upper section 130 is held in place on the side portion 120 by a series of screws 132.

When one of the cards is fed from the card holder 10, for example, to the periphery of the drum 16 in the manner described above, such a card is held on the outer peripheral surface of the annular side portion 120 by vacuum pressure in a manner to be described.

A deflector ring 140 is supported within the interior of the drum 16 in press fit within the inner surface of the annular side portion 120. This deflector ring is tapered toward the center of the drum to prevent turbulence and to provide a streamlined path for air that is drawn in through the orifices 122 and 124.

The portion 118 of the lower section of the drum 16 contains a central opening surrounded by an annular collar 141. The collar 141 surrounds a collar 142 provided at one end of a hollow shaft 144. The drum 16 is supported on a shoulder formed by the collar 142, and the end of the shaft extends into the opening of the portion 118 in friction fit with that portion. Therefore, rotation of the hollow shaft 144 causes the drum 16 to rotate. Also, the interior of the hollow shaft 144 communicates with the interior of the drum. Bearings 146 are provided at opposite ends of the shaft 144. The inner races of the bearings 146 are mounted on the shaft 144, and the outer races of the bearings are disposed against bushings 148 secured to a housing 150 by studs 152.

An arcuate opening 156 is provided in the housing 150 between the bearings 156. This opening enables a drive belt 158 to extend into the housing and around a pulley 160. The pulley 160 is affixed to the shaft 144 between the bearings 146, and the pulley is held against axial movement by sleeves 162. In this way, the shaft 144 and the drum 16 can be rotated by a suitable motor (not shown) coupled to the pulley 160 by the drive belt 158.

The bearings 146 and the sleeves 162 are held on the shaft 144 by a nut 166. The nut 166 is screwed on a threaded portion at the bottom of the shaft, and a lock washer 164 is interposed between it and the lower bearing. A sealing disc 168 is also screwed on the threaded portion at the bottom of the shaft 144. The sealing disc 168 operates in conjunction with a bottom plate 170 to inhibit the movement of air between the interior of the housing 150 and the interior of the hollow shaft 144 when a pressure differential exists between the housing and the shaft.

The bottom plate 170 is secured to the housing 150 by studs 172, and it has a central circular opening. A hollow conduit 174 extends into the opening in friction fit with the plate 170. The conduit 174 is axially aligned with the hollow shaft 144 so that air may be exhausted from the hollow interiors of the shaft and the conduit by a vacuum pump 176. The vacuum pump may be of any suitable known construction and, for that reason, is shown merely in block form.

The vacuum pump 176 draws air in through the orifices 122 and 124 and through the interior of the drum 16 down the shaft 144 and through the conduit 174. This creates a vacuum pressure at the outer peripheral surface of the annular portion 120 of the lower section of the drum 16. The vacuum pressure that is so created around the outer surface of the annular portion 120 of the drum serves to firmly retain the cards from the station 10 and from the station 12 on that surface as they are transported on the drum between these two stations.

As noted above, the feed head 18 and the stack head 20 associated with the station 10 are controlled so that when the feed head is brought to its operative position, the stack head is retracted to its standby position, and vice versa. As also noted, a similar control is provided for the feed head 18a and the stack head 20a associated with the station 12.

Figures 5 and 6 show a suitable cam control for the feed head 18 and stack head 20. It will be understood that a similar control can be used for the feed head 18*a* and the stack head 20*a* associated with the station 12.

As shown in Figures 5 and 6, a cam 204 for the heads 18 and 20 is fixed to a cam shaft 206. The cam shaft 206 extends along a vertical axis so that the cam may be rotated on the underside of the table top 11. A suitable sprocket wheel (not shown) is also keyed to the cam shaft 206, and this sprocket wheel receives a drive chain which couples the cam shaft to a suitable driving mechanism. In this manner, suitable rotation can be imparted to the cam shaft 206 and to the cam 204 which is keyed to it.

The driving mechanism referred to in the preceding paragraph may be controlled in a manner, for example, such as described in application Ser. No. 645,639, filed March 12, 1957, so that the cam is rotated through 180° during the time the source is energized. A lever arm 24 is pivotally mounted on the underside of the table top 11 on a pivot shaft 226. The stack head 20 is mounted on one end of this lever arm by means of a screw 227 for movement in the slot 42 in the table top. A cam follower 228 is rotatably mounted on the lever arm 224 at an intermediate point on the arm between the pivot shaft 226 and the end of the arm remote from the screw 227 which supports the stack head.

A second lever arm 230 is pivotally mounted on a pivot shaft 232 at the other side of the cam 204. This second lever arm is also mounted on the underside of the table top 11, and the pivot shaft 232 (like the pivot shaft 226) extends upwardly through the table top. The lever arm 230 has a cam follower 234 rotatably mounted at an intermediate point on the arm between the pivot shaft 232 and the upper end of the lever arm. The feed head 18 is mounted on the lower end of the lever arm 230 for movement in the slot 38 in the table top.

A coil spring 236 is coupled between the ends of the lever arms 224 and 230, and this spring biases the cam followers 228 and 234 against the peripheral edge of the cam 204.

The cam 204 is shaped so that at one angular position (as shown in Figure 6), it moves the lower end of the lever arm 224 and the stack head 25 to the left of the slot 42 in Figure 5 at the same time it moves the lower end of the lever 230 and the feed head 18 to the left end of the slot 38. In a second angular position of the cam 204 (as shown in Figure 5), the cam is shaped to move the lower end of the arm 228 and the stack head 20 to the right hand end of the slot 42 and the lower end of the arm 230 and the feed head 18 to the right hand end of the slot 38.

That is, the view of Figure 6 shows the cam in a position in which the stack head is moved forwardly to its operative position, and the feed head 18 is retracted to its stand-by position. Alternately, the view of Figure 6 shows the cam 204 in position to retract the stack head 20 to its standby position and to move the feed head 18 forward to its operative position. As noted above, the driving mechanism for the cam 204 may be controlled in the manner described in copending application Ser. No. 645,639, so that successive actuations of the driving mechanism causes the transfer mechanism associated with the station 10 alternately to assume the position of Figure 5 and the position of Figure 6.

The invention provides, therefore, an improved data processing system which incorporates apparatus including a rotatable wheel at the mouth of each of the stations of the system. Each of the wheels is rotatable, and when a corresponding station is conditioned to a stacking mode, its wheel causes the cards fed into the station to assume a desired approach angle to the vacuum pressure transporting drum. In the described manner, this maintains a sufficient clearance between the mouth of the particular station and the transporting drum. The cards are therefore properly deposited from the drum into the station, and any tendency for the cards to become jammed at the entrance of the station is overcome.

The improved apparatus and combination of the present invention permits cards to be fed to the various stations at a relatively high rate of speed, and it permits a relatively large number of cards to be fed into the various stations.

The arrangement is such, that when the apparatus of the invention is incorporated in a reversible station, the rotatable wheel of the apparatus is rendered ineffective while the station is in its feeding mode. This latter feature is accomplished by the simple expedient of causing the feed head at the station to move the cards away from the periphery of the wheel when the feed head is in its operative position. This enables the wheel to be continuously rotated without interfering with the cards when the station is conditioned to a feeding mode.

Also, by means of the described simple supporting housing, the rotatable wheel may conveniently be suspended over the path of the feed head at the various stations. This particular mounting technique enables the apparatus to be utilized in the described manner without interfering with the other operating components of the station with which it is associated.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In a system for processing data on a plurality of information storage cards, the combination of: transporting means for the cards, card holding means disposed adjacent said transporting means and including a card supporting surface and a pair of spaced guide rails, transfer means for depositing cards from said transporting means into said card-holding means in stacked condition between said guide rails and with the cards resting on said supporting surface, and movable means for engaging one end of the cards deposited in said holding means by said transfer means to draw such end away from said transporting means and maintain at least the leading cards in the card holding means at an angle to said transporting means to facilitate the deposit of subsequent cards in said card holding means.

2. In a system for processing data on a plurality of information storage cards, the combination of: means including a rotatable drum for transporting the cards in fixed position on the peripheral surface of the drum during the drum rotation, card holding means disposed adjacent said drum and including a card supporting surface and a pair of spaced walls, transfer means for depositing cards from said rotatable drum into said card holding means in stacked condition between said guide rails with the cards resting on said supporting surface, and a rotatable wheel for engaging the trailing ends of the cards deposited in said holding means by said transfer means to draw such ends away from said rotatable drum and to maintain at least the leading cards in said holding means at an angle to said rotatable drum.

3. In a system for processing data on a plurality of information storage cards, the combination of: transport means movable in a closed loop for holding the cards in fixed position on the transport means during such movement, card holding means disposed adjacent said transport means and having a card supporting surface and further having a pair of spaced guide rails extending along said surface, transfer means disposed in coupled relationship to said transport means and said card holding means for transferring cards between said transport means and said card holding means with the cards resting on said supporting surface, and means movable in a closed loop for frictionally engaging one end of the cards in said holding means to draw such end in a direction corresponding to that of the spaced guide rails and to maintain the cards at an angle to the transport means for facilitating the transfer of the cards between the transport means and the card holding means.

4. In a system for processing data on a plurality of information storage cards, the combination off: means including a rotatable transporting drum for holding the cards in fixed position on the periphery of the drum during the drum rotation, card holding means disposed adjacent said transporting drum and having a card-supporting surface and further having a pair of spaced guide rails extending along said surface, transfer means for depositing cards from said rotatable drum into said card holding means in stacked condition with the cards resting on said supporting surface, and a wheel disposed adjacent one of said guide rails and rotatable in a direction and at a position frictionally engaging a particular end of the cards deposited in said card holding means by said transfer means to draw such ends away from the periphery of said drum and to maintain at least the leading cards in said card holding means at an angle to such periphery for facilitating the depositing of successive cards from said rotatable drum to said card holding means.

5. In a system for processing data on a plurality of information storage cards, the combination of: means including transport means movable in a closed loop for transporting information cards on its peripheral surface, a card-stacking station disposed adjacent said transporting means including a supporting surface and a pair of spaced guide rails extending along said surface, means including a stacking head for engaging the leading edges of successive ones of the cards transported on said transport means to remove such cards and deposit the same in said stacking station in a stacked condition with the cards resting on said supporting surface, a wheel disposed adjacent the leading one of said guide rails with respect to the movement of said transport means and rotatable about an axis for frictionally engaging the trailing ends of the cards removed from said transport means by said stacking head, and drive means for said wheel for causing the same to rotate and draw the trailing ends of such cards away from the periphery of said transport means and maintain the leading cards in said station at an angle to the periphery of said transport means for facilitating the depositing of cards from said transport means to said stacking station.

6. In a system for processing data on a plurality of information storage cards, the combination of: means including a rotatable vacuum pressure transporting drum for transporting information cards on its peripheral surface, a reversible station disposed adjacent said drum and including a card-supporting surface and further including a pair of spaced guide rails extending along said surface, means including a stack head disposed adjacent the trailing one of said guide rails with respect to the rotation of said drum and having an operative position for engaging the leading ends of successive ones of the cards transported on said drum to remove such cards and deposit the same in a stacked condition in said station and with the cards resting on said supporting surface, means including a feed head disposed adjacent the leading one of said guide rails with respect to the rotation of said drum and having an operative position for controllably feeding cards from said station to said drum, means for moving said feed head and said stack head between such operative positions and standby positions, a wheel disposed adjacent the leading one of said guide rails and rotatable about an axis for frictionally engaging the trailing ends of the cards removed from said drum by said stack head when said stack head is in its operative position, said feed head disengaging the cards from said wheel when said feed head is in its operative position, and drive means for said wheel for causing said wheel to rotate in a direction for drawing the trailing edges of such cards away from the periphery of said drum and for maintaining the leading cards in said station at an angle to the periphery of said drum when said stack head is in its operative position.

7. The combination defined in claim 6 in which said leading guide rail has a bifurcated end portion for receiving said feed head when the same is moved to its operative position, and which includes means for suspending said wheel with the periphery of said wheel extending through said bifurcated end portion of said leading guide rail into said station.

8. Apparatus for transporting and storing information storage cards including: transporting means for the cards, holding means for the cards positioned adjacent said transporting means, transfer means for obtaining a transfer of cards between said transporting means and said holding means, and movable means for engaging respective ends of the cards in said holding means to draw such ends in a direction transverse to the disposition of each card in the holding means and facilitate the transfer of cards between said transporting means and said holding means.

9. Apparatus for transporting and stacking information storage cards including: transporting means for the cards, receiving means for the cards positioned adjacent said transporting means and constructed to hold the cards in stacked relationship, transfer means for obtaining a transfer of cards between said transporting means and said receiving means, and means movable in a direction for engaging respective ends of the cards in said receiving means to draw such ends in a direction transverse to the disposition of each card in the receiving means and maintain at least the leading ones of the stacked cards in said receiving means at an inclination to said transporting means for facilitating the transfer of cards between said transporting means and said receiving means.

10. Apparatus for transporting and stacking information storage cards including: a supporting table, transporting means for the cards positioned on said supporting table, support means including a pair of spaced guide rails positioned on said table adjacent said transporting means for supporting cards therebetween in a stacked condition with the cards resting on the supporting table, transfer means disposed in coupled relationship to the transporting means and the support means for obtaining a transfer of cards between said transporting means and said support means, and movable means for engaging the trailing ends of the cards in said support means to draw such trailing ends in a direction corresponding to the disposition of the spaced guide rails and maintain at least the leading cards of the stacked cards at an inclination to said transporting means to facilitate a transfer of cards between said transport means and said support means.

11. Apparatus for transporting and stacking information storage cards including: a supporting table, transporting means movable in a closed loop for carrying the cards positioned on said supporting table, support means including a pair of spaced guide rails positioned on said table adjacent said transporting means for supporting cards therebetween in a stacked condition with the cards resting on said supporting table, transfer means disposed in cooperative relationship with said transporting means and said support means for obtaining a transfer of cards between said transport means and said support means, means including a rotatable wheel mounted adjacent one of said guide rails for engaging particular ends of the cards in said transfer means, and means for driving said wheel in a direction to draw such particular ends of the cards in a direction corresponding to the disposition of the spaced guide rails for maintaining at least the leading cards of the stacked cards at an inclination to said transporting means to facilitate the transfer of cards between said transporting means and said support means.

12. Apparatus for transporting and stacking information storage cards including: a supporting table, a rotatable transporting drum supported on said table for transporting cards in sequence on its peripheral surface, holding means including a pair of spaced guide rails positioned on said table adjacent said transporting means for supporting cards therebetween in a stacked condition, transfer means cooperative with said transporting means and said card holding means for obtaining a transfer of cards between said transporting means and said card holding means, a rotatable wheel mounted adjacent the leading one of said guide rails with respect to the direction of rotation of said drum to engage the trailing ends of the leading cards in said holding means, and means for driving said wheel in a direction to draw the trailing ends of the cards away from the peripheral surface of said transporting drum to maintain at least the leading ones of the deposited cards at an inclination to the periphery of said drum for facilitating the transfer of cards between said transport means and said holding means.

13. Apparatus as set forth in claim 9 in which means including a pusher member are disposed in the receiving means to urge the cards in the receiving means toward the transport means.

14. Apparatus as set forth in claim 1 in which a pusher member is disposed in the receiving means to confine the cards in the receiving means between the pusher member and the transport means and in which a spring is coupled to the pusher member to urge the pusher member against the cards for maintaining the cards in stacked relationship.

15. Apparatus as set forth in claim 3 in which a pick-off member is disposed in coupled relationship to the transport means between the first and second guide rails to facilitate the transfer of cards from the transport means into the card holding means.

16. Apparatus as set forth in claim 8 in which the movable means is mounted in spaced relationship to the holding means and in which means are coupled to the movable means in position for driving the movable means without affecting the transfer of cards between the transporting means and the holding means.

17. Apparatus as set forth in claim 6 in which the wheel is supported in spaced relationship to the guide rails and to the feedhead and the stackhead for providing for the movement of the feedhead and the stackhead to their operative and standby positions without any interference from the wheel or the drive means for the wheel and in which means including a pusher member and spring-biasing means for the pusher member are disposed in the station to urge the cards in the station toward the transporting drum.

References Cited in the file of this patent

UNITED STATES PATENTS

| | | |
|---|---|---|
| 2,125,199 | Rheutan | July 26, 1938 |
| 2,699,942 | Rineer | Jan. 18, 1955 |
| 2,752,154 | Nelson | June 26, 1956 |